(12) United States Patent
Larimer

(10) Patent No.: US 6,402,358 B1
(45) Date of Patent: Jun. 11, 2002

(54) FIBER OPTIC ILLUMINATOR

(76) Inventor: Roy Larimer, 115 Colonial Pkwy., Yonkers, NY (US) 10710

( * ) Notice: Subject to any disclaimer, the term of this patent is extended or adjusted under 35 U.S.C. 154(b) by 0 days.

(21) Appl. No.: 09/440,350

(22) Filed: Nov. 15, 1999

Related U.S. Application Data

(60) Provisional application No. 60/108,617, filed on Nov. 16, 1998, and provisional application No. 60/127,900, filed on Apr. 6, 1999.

(51) Int. Cl.$^7$ .............................. F21V 8/00; G02B 21/06
(52) U.S. Cl. ........................ 362/575; 362/11; 362/228; 362/552
(58) Field of Search ............................ 362/3, 11, 16–18, 362/228, 295, 552, 554, 572, 575, 558

(56) References Cited

U.S. PATENT DOCUMENTS

| | | | |
|---|---|---|---|
| 4,006,487 A | | 2/1977 | Allen .......................... 354/79 |
| 4,065,859 A | * | 1/1978 | Mecklenborg ............... 434/42 |
| 4,428,029 A | | 1/1984 | Baliozian ..................... 362/12 |
| 4,464,705 A | * | 8/1984 | Horowitz ..................... 362/12 |
| 5,029,309 A | * | 7/1991 | Jones .......................... 396/155 |
| 5,034,761 A | * | 7/1991 | Jones .......................... 396/155 |
| 5,860,850 A | | 1/1999 | Larimer ....................... 451/41 |

OTHER PUBLICATIONS

Gilman, "Photo Slit Lamp Biomicrography"; http://webeye.ophth.uiowa.edu/ops/op–photo/slitlamp/slitlamp.htm.
"Fiber Optic Illuminator Research Project"; http://eetd.161.gov/btp/fiberoptics.html.
"Fiber Optic Illuminator;" http://www.wpiine.com/wpi/microscopycameras/fo illuminator.html.
"Long–Life Fiber Optic Illuminator".
"Fiber Optic Lighting Systems: An Overview"; http://www.fiberstars.com/overview.html.
"Fiber Optic Systems"; http://eande.lbl.gov/R–LabDG/help3503.htm.
"Fostecfiber Optic Bundles with Hologen Light"; http://www. subtechnique.com.
"Fiber Optic flux Calculation"; http://eande.lbl.gov/R–Lab DG/Help 3503.htm.
"NAVITAR CCTV Lens Accessories and Fiber Optic Lighting" http://www/subtechnique.com/noframes/navitar/oem/vlacc.htm.
"140 Most Advanced Fiber Optic Illuminators"; http://www.kentscientific.com/99WebCatalog/140.html.
"Fiber Optic Bundles"; http://www.perkinelmer.com/opto.111.

* cited by examiner

Primary Examiner—Alan Cariaso
(74) Attorney, Agent, or Firm—Milde & Hoffberg, LLP

(57) ABSTRACT

A fiber optic illumination system having a plurality of fiber optic heads, each head producing pilot and strobe illumination from an exit aperture, one or more pilot lamps, each producing a pilot light output, and one or more strobes, each producing an illumination flash pulse, wherein each fiber optic head produces a pilot light having an intensity which has a predefined relationship to an intensity of an illumination flash pulse from that head, and fiber optic head produces an illumination flash pulse which has an equivalent color. Means are provided for varying the relative output of each fiber optic head.

28 Claims, 19 Drawing Sheets

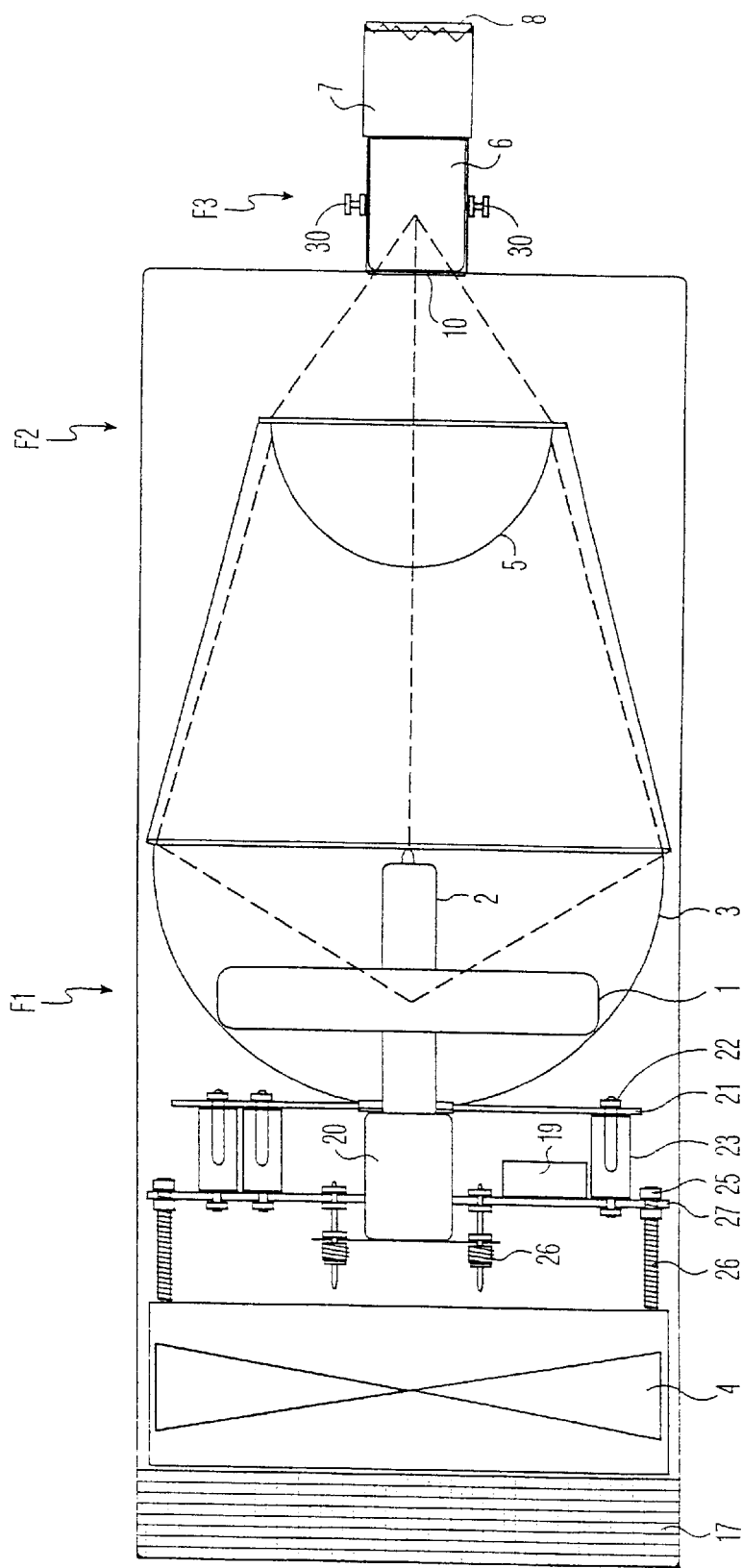

FIBER OPTIC ILLUMINATOR

This application claims benefit of priority from U.S. Provisional Patent Application Serial Nos. 60/108,617 filed on Nov. 16, 1998 and 60/127,900 filed on Apr. 6, 1999.

FIELD OF THE INVENTION

The present invention relates to the field of photographic illuminators, and more particularly to the field of microphotographic illumination systems including a pilot light and strobe light.

BACKGROUND OF THE INVENTION

It is well known to employ illumination systems for microphotography. Typically, these take two forms: ring lights and fiber optic illuminators. In addition, illumination systems are well known for microscopy, and long exposures for photographic purposes have often been employed to make use of a single illumination mode light source. A combined pilot lamp and strobe single head fiber optic illuminator for photomicroscopy is described in Allen, U.S. Pat. No. 4,006,487, expressly incorporated herein by reference. A ring light is a device that encircles a camera lens to provide radially uniform illumination, generally producing a shadowless image. A ringlight setup is unsuitable for many types of work, and is generally unavailable for microscopy, for example due to spatial constraints. Further, ring lights do not provide for rear illumination of transparent or translucent samples.

Fiber optic illuminators serve three essential functions. First, they may filter infrared and ultraviolet rays and thus avoid heat load and UV degradation of the subject. Second, they allow versatile positioning of multiple, e.g., three, illumination heads, which may be positioned arbitrarily with respect to the subject, including behind it. Third, fiber optic illuminators are known which integrate both pilot lamp and flash lamp, allowing the same optical fibers to carry flash illumination for photographic exposure and pilot light illumination for modeling and light source positioning. A pilot light is thus a lower intensity illuminator designed for composing the image visually, using a different, lower intensity continuous output light source than the strobe flash. Thus, it is known to align the pilot lamp and flash lamp within an aperture of al fiber optic collector, so that both sets of rays impinge upon the same optical fibers, thus assuring illumination along the same axis. However, such known systems generally suffer from a deficiency in that the ratio of pilot lamp to flash illumination may vary between fiber optic pickups, and that the flash illumination itself may vary in color balance between pickups at various locations.

Existing fiber optic illuminators thus suffer from poor homogeneity of the light output, and variations in relative light intensity between the pilot illuminator and the flash, as well as between different color of illumination by heads within the system. Thus, significant experimentation is necessary for high quality images to compensate for the inconsistencies.

Traditional designs of studio or professional-type illuminators do not necessarily seek high optical efficiency. Thus, in order to provide a robust, flexible, reliable and consistent system, light output may be wasted. Thus, the cost of power, equipment, and replacement parts (e.g., bulbs) are considered secondary to functionality. In production environments, i.e., those where the task is cataloging, data acquisition, documentation, or otherwise taking a large number of images, pilot lighting is important to avoid loss of productivity due to multiple exposures in order to properly compose the image prior to final image acquisition. Further, for transient, unstable or moving subjects, flash illumination is essential to freeze the image. Thus, a dual illumination mode illuminator is essential in such environments.

In production environments, the illumination system typically provides substantial excess illumination capacity, anticipating waste. In fact, this waste is generally acceptable in many environments, but limits the use of the systems to studios and other controlled environments with sufficient resources. For example, with a 250 Watt halogen pilot lamp, the fiber optic illuminator system requires substantial air flow and cooling, and an insulated case or other barrier to prevent human burn hazard and overheating. The fan provided for cooling produces a steady noise, and with the required air flow passages it is difficult to muffle the noise made by strobe triggering. Portable battery operation is typically restricted because of the high power draw.

A known design for a fiber optic illumination system provides an attachment to a standard studio strobe with modeling lamp, described in Baliozian, U.S. Pat. No. 4,428,029, expressly incorporated herein by reference, wherein a set of fiber optic pickups are arrayed in front of the strobe with each pickup aligned facing toward both the strobe and modeling lamp. A mechanical barrier or shutter allows modulation of light to the set of pickups, while traditional optical components may be placed at each fiber optic head. Prior fiber optic illuminators with both pilot and strobe modes, including the aforementioned type, suffered low optical efficiency due to poor utilization of the light output both illumination sources. In other words, the fiber optic bundles were not arranged to capture a large percentage of the available light output, but rather to provide modular arrangement and simple design. Further, each fiber optic bundle was independent, and therefore critically dependent on the positioning and local variations in lamp output. Therefore, while the fiber optic bundles indeed carried both pilot and flash illumination, the efficiency was low, and the illumination intensity and color balance were non-uniform and unregulated.

Strobe light output is generally governed by the time-intensity product of the flash. The intensity, in turn, is governed by the voltage and current (power) delivered to the flash lamp. Typically, the energy for the flash lamp is stored in a capacitor prior to triggering. The static voltage across the capacitor is insufficient to ionize the xenon gas within the tube, so a substantially higher potential trigger pulse is provided to commence the flash cycle. The flash cycle can be terminated in two ways. First, the energy stored in the capacitor can be fully discharged, down to a voltage insufficient to maintain ionization of the gas in the flash tube, and thus until the flash lamp no longer sustains conduction, or a high voltage semiconductor or switch can terminate the current flow in advance of full discharge.

The color temperature of the flash lamp depends on a number of factors, but for a given lamp, the current flow generally correlates with the color temperature over the course of a flash cycle. Thus, using a switch to prematurely terminate the flash cycle at an arbitrary time before complete discharge to control intensity will also have the undesired effect of changing the average color temperature of the lamp output over the flash cycle, since as the capacitor discharges, the voltage will drop and therefore the current through the lamp will drop over time. Using a single capacitor, complete discharge does not provide an efficient control over intensity, and therefore, a controllable shutter, iris or neutral density filter would be necessary to modulate output without changing color balance. This problem is compounded by known strobe drive systems that employ a rheostat (variable resistor) to control flash output; with each different setting of the rheostat, a different color temperature output would be expected due to the change in current through the lamp.

Therefore, advanced designs were developed to provide a plurality of capacitors within the strobe power pack, which are selected based on the desired output intensity. Thus, instead of seeking to drive the flash lamp over one or more orders of magnitude using pulse width intensity modulation, by cutoff timing alone, an appropriate capacitance and charge voltage is selected to normalize the starting and ending voltage on the flash lamp over the course of the cycle, and therefore impliedly normalizing the current and color temperature. So-called studio strobe power pack systems may therefore provide one or more capacitors (e.g., two), each of which may be charged to produce a predetermined power, e.g., 125, 250 or 500, Watt-seconds, and employed individually or in parallel (e.g., up to 1000 Watt-seconds, total), to power one to four heads. Such a design is incorporated in the M1000E power pack from Dyna-Lite, Hillside. N.J. Thus, the voltage and stored charge may be varied to alter illumination intensity, without altering output impedance. It is note that in such systems, the desired light output range must be set in advance. Fine adjustment of exposure is therefore effected by optical filters, variable apertures (irises), or the like.

Another known modulation system, typically employed in types of mobile strobe systems, provides for a series of mini-strobe pulses, which sum to the desired illumination. This method, while efficient, may result in change in color balance because the available power supply is unable to commence each pulse with a fully charged capacitor, especially for long duration flash cycles, due to increasing battery source impedance. Even high voltage battery supplies for strobes require the flash capacitor, due to the relatively high source impedance of the battery as compared to the capacitor.

Thus, the prior art has sought to provide strobe photographic illuminators with modeling lights having balanced ratio modeling illumination and accurate color balance, without meeting each of the objectives described herein.

SUMMARY OF THE INVENTION

The present invention provides a fiber optic illumination system which, in a first embodiment, provides excellent uniformity of illumination between lighting heads and between pilot and flash modes in both color and light output.

According to one embodiment, a fiber randomizer is preferably provided to evenly distribute light between respectively varying sources and destinations.

In a second embodiment, a single high power halogen pilot lamp is replaced with one or more metal vapor or fluorescent lamps. In this case, the pilot lamp color may vary substantially from a typical 3700 C for a halogen incandescent bulb. However, the color balance of the pilot lamp is generally not critical, so long as the object is visible and the lighting intensity closely approximates the flash in distribution and proportion. This improvement provides a lower power, higher efficiency, longer life pilot illuminator.

In a third embodiment, a common strobe lamp is provided for each fiber optic head, with a plurality of pilot lights being separated from the strobe, and the optical fibers carrying the pilot illumination are interspersed with optical fibers carrying the strobe. Alternately, the one type of light may enter the fiber from an end, while the other may enter through a side wall, thus providing a common pathway for both light sources.

In a fourth embodiment, a common strobe is provided for each fiber optic head, with separate pilot illuminators, each pilot illuminator being normalized in output to provide fixed ratio illumination between the respective strobe and pilot.

In a fifth embodiment, each fiber optic head includes a separate flash lamp and pilot illuminator, with a system for normalizing the output of each head.

A preferable embodiment of the present illumination system was designed to facilitate the proper lighting conditions to enable top quality color photographs of small objects in either micro or macro photographic conditions. This unit has been employed in conjunction with many types of cameras, lenses and microscopes with excellent results. This unit was primarily designed for use with high-resolution digital cameras, although it is suitable for all types of photography. Digital cameras are sensitive to Infra red light and in many cases employ a filter over the lens or CCD chip, to avoid IR contamination. The present illumination system eliminates the need for such a filter, thus increasing the overall throughput of the lens. A preferred embodiment employs efficient means to gather and transmit light to a specific point, with the use of fiber optic conduits. The light output is preferably controlled in at least two ways, neither of which change the light color temperature. Primary control is achieved with a capacitor discharge power pack system top control strobe operation. Secondary control is achieved through the use of mechanical irises, in-line with the fiber optic conduit. The light delivered to the subject is a cold light, ideal for heat sensitive subject matter. The preferred embodiment is a self contained unit and is not reliant on any specific camera lens or microscope.

Preferably, the system has a plurality of illumination heads, e.g., three heads, which are independently targetable toward the object to be illuminated. Therefore, illumination from various positions simultaneously is possible. In one embodiment, a single illuminator having strobe and pilot modes is provided which is adapted to be used with other illuminators to provide a predetermined precise pilot to strobe intensity ratio over a range of strobe output levels.

Typically, it is desired to turn off or block the pilot illumination during exposure, to ensure that the strobe color balance is preserved. In the case of an incandescent bulb pilot lamp, this requires a brief shutdown (cool-off) period, for example up to 5 seconds. Incandescent bulbs glow orange then red while cooling, and thus must be substantially cooled to avoid color shifts. After the strobe is discharged, the incandescent bulb must be restarted. It is well known that such restarts diminish the life of the bulb, and further that the start and stop latency may reduce productivity. Therefore, according to one aspect of the invention, the pilot lamp is provided as a short-persistence fluorescent bulb or metal vapor lamp, in which the pilot lamp is momentarily turned off, only for a short period, and therefore is not subject to substantial restart latency. For example, in a lamp with an alternating current drive circuit, the drive circuit may block current flow during a limited number of current cycles, while maintaining the bulb "warmed up" during the hiatus.

In one example, a 50 Watt high pressure sodium vapor lamp is employed. Typically, the strobe illumination is on the order of up to one thousandth of a second, and is thus faster than the camera shutter. Mechanical shutter flash synchronization speeds range from about $1/75$ to $1/500$ second (2–15 mS). Typically, a high pressure sodium vapor lamp runs at 60 Hz, Therefore, the lamp may be turned off for as little as $\frac{1}{2}$ to 1 cycle (9–18 mS). The cessation of illumination comes almost immediately after electrical power cutoff, since current flow rather than heat is the primary cause of light output. Practically, in order to assure strobe and shutter synchronization, as well as adequate decay of pilot light emission, a hiatus of 100–250 mS may be appropriate. In any case, this hiatus is short enough to allow rapid restart of the lamp with minimal warm-up delay. If necessary, color balance may be improved in the pilot light by providing a complementary lamp, such as a mercury vapor lamp, which may be controlled similarly to provide a mix of orange (sodium) and blue (mercury) pilot light and a hiatus during strobe.

In another case, the pilot lamp is distributed, with a source portion provided associated with each flash head. In this case, the pilot lamp may be, for example, a 5–25 watt fluorescent or halogen incandescent bulb. Since the pilot lamps are distributed, a means for equalizing light output is provided. The pilot light from a head should have an intensity that directly corresponds to the intensity of the flash associated with that head, in a predetermined ratio so that the pilot lights from all heads together may be judged together. While the intensity of a metal vapor or fluorescent lamp may be modulated (over a limited range) by altering a drive waveform, with less significant change in color output, incandescent lamps have a color that changes materially with change in output. Thus, an iris, shutter or filter is preferred to produce large variations in light output, which can be used to adjust both the pilot and flash intensity.

It is noted that, in many systems, the range of brightness modulation available for the pilot lamp is limited. Thus, both incandescent and fluorescent bulbs have a predefined operating point. In order to obtain a range of illumination intensities, a number of individual bulbs may be selected or "recruited" to vary the overall illumination intensity while operating each element within its design parameters. Therefore, embodiments of the present invention may employ a number of separate pilot lamps which are individually controlled to produce a desired level of illumination, for example correlating to the selected power level of the flash lamp.

In order to normalize a distributed pilot lamp to the associated flash output, a calibration procedure is performed. Essentially, the calibration procedure seeks to assure a constant relation between the flash output and the pilot lamp output for each fiber optic head, thus allowing accurate surrogacy of the pilot during modeling and positioning. Preferably, each fiber optic head also has a normalized light output, but this is not required, since the light output of each head is preferably separately controllable at the discretion of the operator.

In one embodiment, an electronically adjustable pilot intensity control is provided to the pilot in each head. During a calibration phase, a light sensor measures the strobe output for each head under known conditions (e.g., 18% gray reflectance), and then adjusts the pilot to produce a fixed and equal percentage of the strobe output for that head. The direct light output to produce the calibration condition is then compared to the calibration level and a closed loop feedback control implemented to maintain the ratio over time and over varying environmental conditions. Each control may shut off the local pilot immediately before strobe exposure, and re-power the pilot thereafter, to the adjusted intensity level. In this way, it is also possible to control and normalize the intensity of the pilot to accurately represent the intensity of the flash.

The present invention preferably provides a plurality of strobe outputs having a consistent color temperature over a range of output levels. This allows variation in exposure without color temperature shift. It is well known that, in powering a strobe, use of pulse width modulation over a large range will vary the color output of the tube. In order to remedy this, it is preferred that the starting voltage on the capacitor for each flash discharge cycle within a set be equal. The intensity of the strobe may then be modulated by providing one or more strobe capacitors in parallel to alter the discharge power, and by limiting the light by use of filters, shutters or irises. Therefore, the time-normalized shape of the discharge pulse is maintained, thus balancing the color of the flash potentially over orders of magnitude of output.

Each flash head preferably also includes a mechanical iris or shutter to block portions of the flash and pilot light. This method, however, is inefficient and potentially reduces flash bulb life, and is therefore preferably provided primarily for fine adjustments and differential adjustments between the heads.

It is noted that color balance is more important between respective heads during an exposure or set of exposures than per an absolute standard. Thus, it is possible to provide various methods for modulating strobe output, so long as the same output is obtained from each source. It is also possible to intentionally provide variations in color from the various heads.

By providing equal color balance from each head, artifacts due to different color shadows are avoided. On the other hand, these artifacts may be intentionally applied if predictable.

An important aspect of various embodiments of the invention is the use of a fiber randomizer to ensure that fibers to each fiber optic head have a relatively uniform distribution with respect to variations in source characteristics, thus assuring uniform illumination to each fiber bundle in spite of variations at the particular location of the source fiber. Thus, while the many fibers may have significantly different illumination conditions, and thus have non-uniform light intensity, color, transmission mode, and other characteristics, once highly randomized, these bundles will have essentially matched characteristics.

In a preferred embodiment, the pilot lamp and flash lamp are housed together, with each fiber directed toward and receiving illumination from both lamps. This is possible because the flash lamp is transparent, and may be aligned with the filament of the incandescent lamp.

As discussed above, in one embodiment, both the pilot lamp and flash lamp are individually provided in each head. An electronic exposure control ensures that each pilot lamp output corresponds to the flash output, with electronic and/or mechanical control over the output of each head. If it is desired that each head have the same base output, this may be provided in various ways. For example, a small fiber or fiber bundle from each lamp may illuminate a common photothyristor. Each flash is triggered separately, for example at 0.5 mS intervals, to produce an identical output. The resulting illumination appears continuous, with few artifacts. Alternately, each head is provided with a separate photothyristor, each of which is calibrated to a common standard.

There are a number of advantages to distributed illumination, including scalability, economies of scale, and reduced need for long, flexible fiber optic cables. In fact, short illuminators may be provided as solid rod light pipes, liquid fiber optic conduits, and/or multiple fibers. Thus, the effects of a single illumination system may be synthesized while providing reduced size and cost standardized components.

Additionally, by providing the flash and pilot lamp closer to the point of use, higher optical efficiencies may be achieved. Thus, the combined outputs of the fiber optic heads may be substantially smaller than the corresponding output of a consolidated light source.

Another advantage accrues from distributed light sources, which is that electronic control over light output is facilitated. Thus, instead of expensive precision mechanical controls or quality optical filters, an electronic control system may be implemented to control light output. This, in turn, allows the mechanical or optical controls to be reduced or minimized. Further, the prospect of electronic control facilitates automation, especially where a predetermined lighting effect is or may be defined.

It is therefore an object of the invention to provide a fiber optic illumination system having multiple fiber optic heads wherein the light output of each head has a normalized relationship between pilot lamp output and strobe output over a range of strobe outputs. The color balance of the plurality of heads for at least a strobe illumination is preferably also normalized.

It is a further object of the invention to provide an illuminator having a continuous output illumination mode and a flash output illumination mode, wherein an illumination intensity ratio of continuous illumination and flash illumination is predefined over a range of flash illumination levels, wherein the illuminator is adapted to have its flash illumination synchronized with other like illuminators, and wherein a color balance of synchronized illuminators may be normalized over the range of flash illumination levels.

These and other objects will become apparent from a review of the Drawings and the Detailed Description of the Preferred Embodiments. For a full understanding of the present invention, reference should now be made to the following detailed description of the preferred embodiments of the invention as illustrated in the accompanying drawings.

BRIEF DESCRIPTION OF THE DRAWINGS

The invention will now be described with reference to the accompanying drawings, in which:

FIGS. 1A and 1B show alternate embodiments of a fiber optic illuminator light source according top the present invention employing an ellipsoidal cold mirror light collector and condenser lens;

DETAILED DESCRIPTION OF THE PREFERRED EMBODIMENTS

Figure 1B:
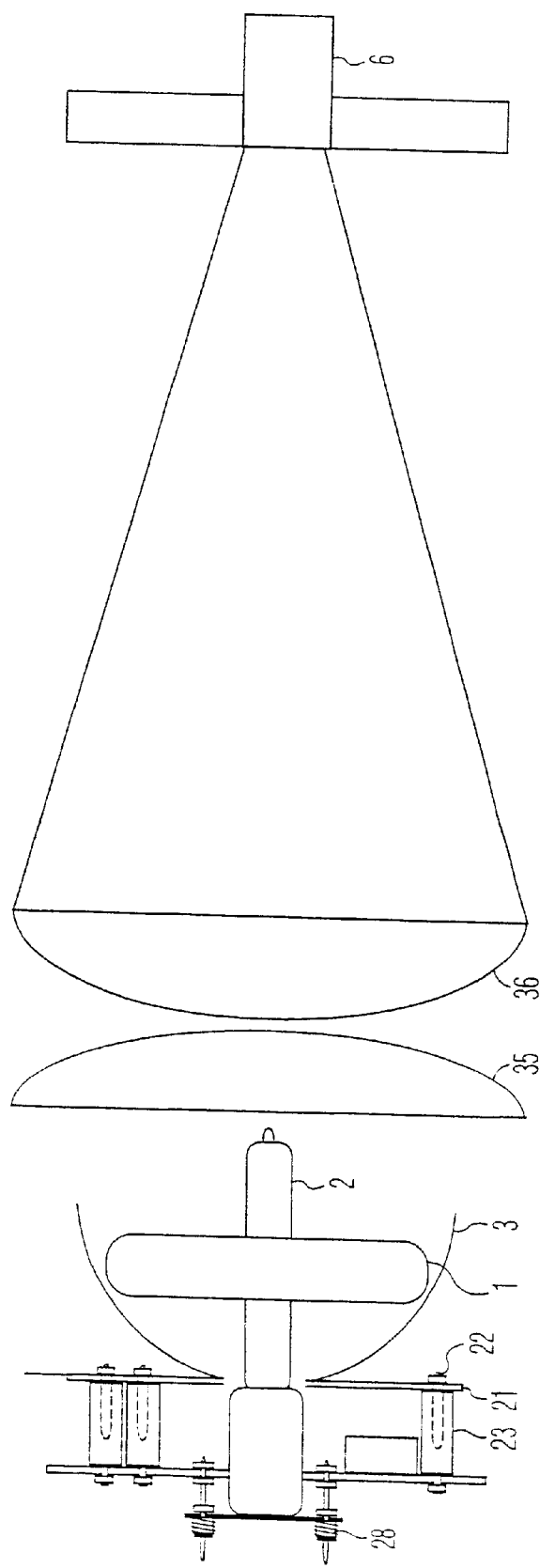

The detailed preferred embodiments of the invention will now be described with respect to the drawings. Like features of the drawings are indicated with the same reference numerals.

FIG. 1A shows an embodiment having an ellipsoid reflector. A torroid-shaped flash bulb 1 sits inside the reflector 3, and around axially oriented pilot lamp 2. The pilot lamp 2 is preferably a 250 Watt halogen targeting lamp, which sits along the central axis of the reflector. The terminals of the flash bulb 1, not shown, extend through off-center holes in the reflector 3. The reflector 3 is a so-called cold reflector, which reflects most visible radiation and transmits about 75–80% of the infrared radiation. A fan 4 is provided to move air through an air filter 17, the illuminator itself, especially through the holes in the reflector 3 (not shown), to ensure cooling of the pilot lamp 2. The air exits through exhaust ports 18.

F1 is the reflector back focal point, and is the relative position of the light source to the reflector 3 to obtain a divergence of the exit spread at point F2, the reflector front focal point within the clear aperture of the short focal length aspheric condenser lens 5. The position of F2 as shown is behind the true focal point of the reflector 3. The condenser lens 5 directs the light to F3, the condenser front focal point, into the fiber optic conduit 6.

The flash lamp 1 is connected to a flash trigger circuit 19, and in fact the flash lamp socket (not shown) and other components may be mounted directly on a printed circuit board, the trigger circuit mounting plate card 27. The pilot lamp 2 is mounted in a standard socket 20, which is typically ceramic, due to the high temperatures resulting from lamp illumination and the requirement for electrical insulation.

The cold mirror reflector 3 is mounted on a reflector mounting plate 21, held in place with male 22 and female 23 quick connect hardware, respectively.

The fan 4 is mounted to the trigger circuit mounting plate 27 by male 25 and female 26 mounting hardware, respectively.

The fiber optic conduit 6 has a pickup end 7, which converts the round fiber bundle in the fiber optic cable 8 into a planar surface 10 to efficiently gather light. The light is transmitted from the source (e.g., the flash lamp 1 and/or pilot lamp 2) onto the planar surface 10, from which the fibers are randomized in spatial arrangement in randomizer 9, with respect to the ultimate destination of the fibers, not shown in FIG. 1.

FIG. 1B is similar to FIG. 1A, however incorporating a pair of condensing lenses 35, 36. This arrangement requires a substantial distance between the ellipsoidal mirror 3 and the fiber optic conduit 6, due to the long focal lengths.

Figure 2:
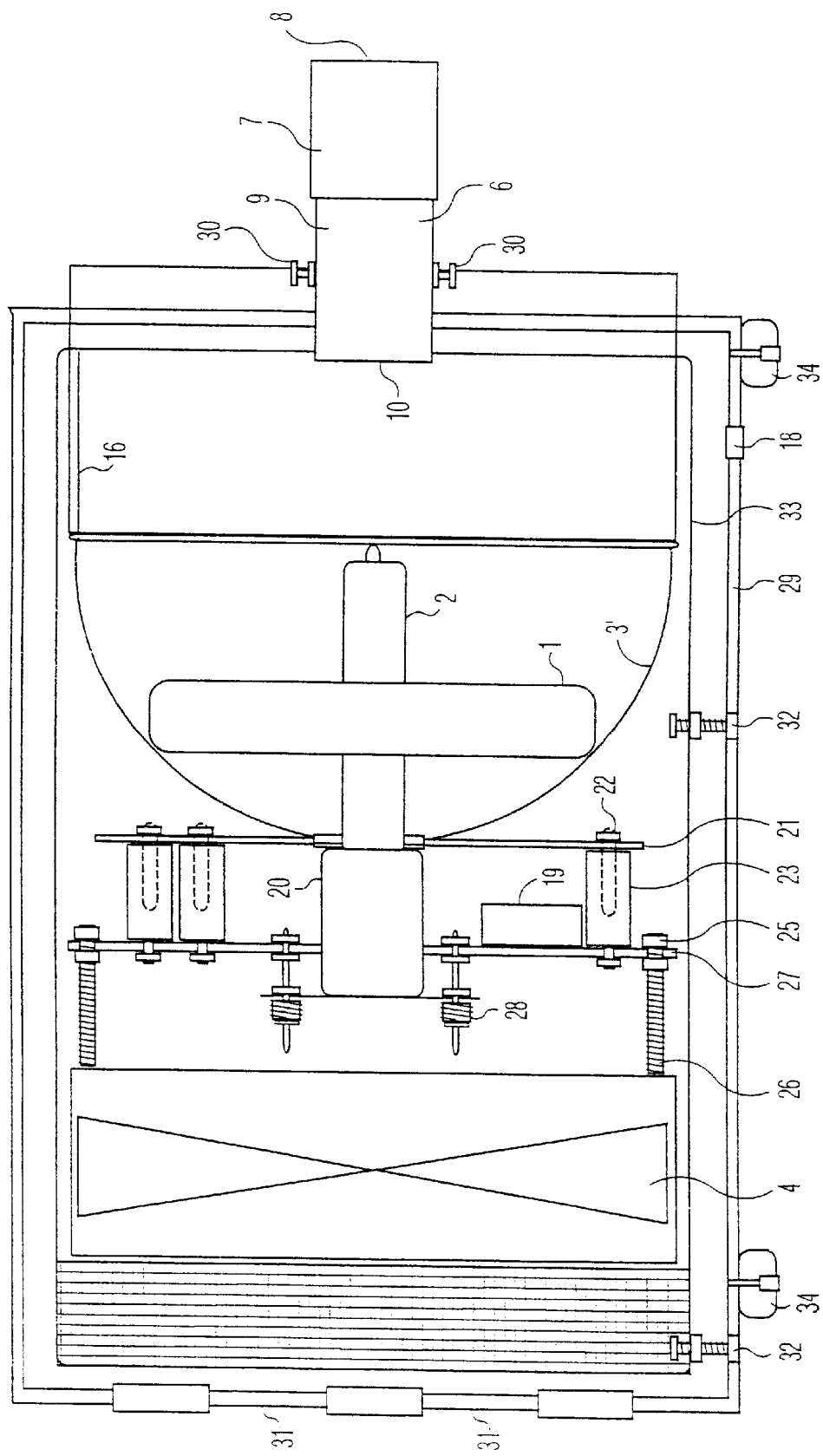
FIG. 2 shows an embodiments of a fiber optic illuminator light source according to the present invention employing an ellipsoidal cold mirror light collector.

FIG. 2 shows a similar embodiment to that shown in FIG. 1, with the exception that no condenser lens is provided and the focal length of the reflector 3' is different. In place of the condenser lens 5 of FIG. 1, a straight reflective baffle 16 is provided. This modification significantly reduces the overall length of the system, while reducing the output by only 16%. This modified version may be adopted where space requirements are an issue, and, for example, only macro photography is intended.

FIG. 2 also shows details of the pneumatic and mechanical design of the housing. Outside of the air filter 17 are air intake ports 31. Inner housing mounting stays 32 provide thermal isolation of the inner compartment housing 33 and the illuminator housing 29. Isolation feet 34, mounted to the illuminator housing 29 by screws provide a stable base to support the illuminator. The fiber optic conduit 6 is separable from the illuminator housing 29 by means of fiber optic locking screws 30.

It is noted that care must be exercised in interfacing the illumination source with the fiber optic collector, in order to avoid over-concentration of light and burning of the planar surface 10 of the fiber optic. This may require defocusing of the light, by adjusting the relative positioning of the flash lamp 1, pilot lamp 2, reflector 3, condenser 5 (if provided) and planar surface 10, in order to distribute the optical energy over all of the fibers. For example, the pilot lamp 2 is mounted to the trigger circuit mounting plate 27 with a pilot lamp focusing assembly 28.

Figure 3:
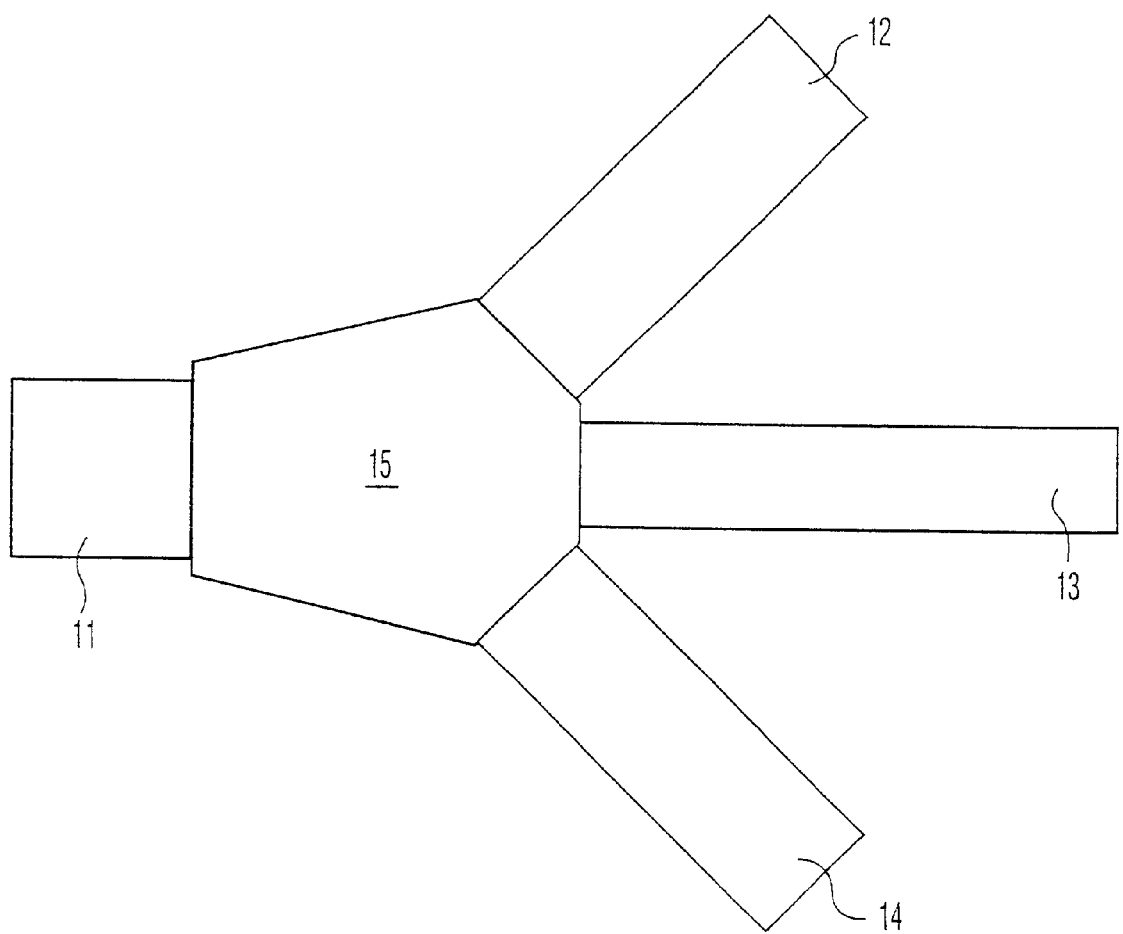
FIG. 3 shows a fiber optic splitter with randomizing chamber.

FIG. 3 shows a one-to-three randomizing and distribution network for fiber optics. A fiber optic bundle 11 enters a randomizing chamber 15, wherein an equal proportion of fibers, selected randomly or to provide an even distribution of source location, to each of the distribution fiber optic bundles 12, 13, 14. Thus, the light transmitted by each distribution fiber optic bundle 12, 13, 14 will contain an equal proportion of the total light carried by the fiber optic bundle 11, and further each distribution fiber optic bundle 12, 13, 14 will be normalized for color and ratio of pilot to flash illumination.

Figure 4A:
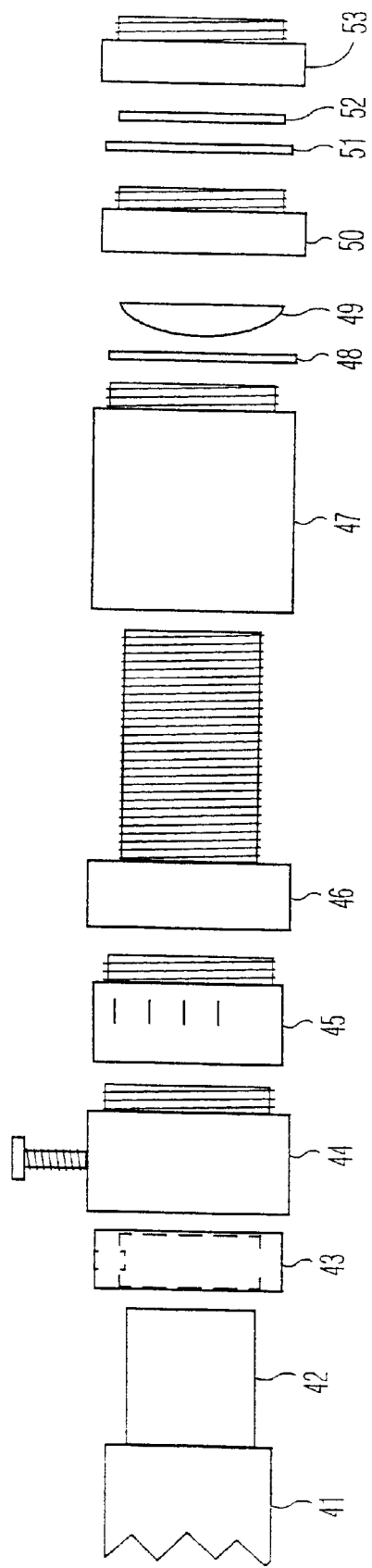
FIGS. 4A and 4B, and 4C and 4D show, respectively, exploded and assembled side views of two embodiments according to the present invention of fiber optic illumination heads.
Figure 4B:
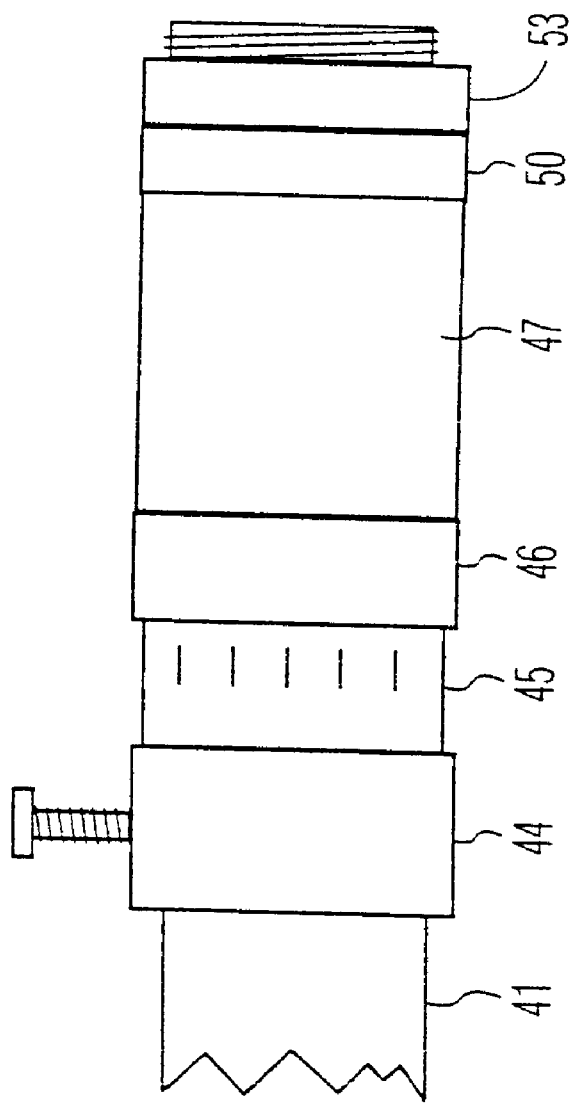

FIGS. 4A and 4B show an exploded and assembled view, respectively, of a focusable fiber optic end assembly, which projects illumination on an object to be photographed. A fiber Optic outer sleeve 41, having fiber optic inner feral 42, fits inside a retainer collar 43, held inside an outer collar adapter 44. A variable iris 45 provides mechanical modulation of light intensity over a wide range (including total occlusion), while maintaining a predetermined ratio of pilot lamp and flash lamp illumination.

A fine thread focus tube inner 46 mates with a fine thread focus tube outer 47 to provide an adjustable distance between the condenser lens 49 and the end of the fiber optic inner feral 42. A retainer ring 48 and outer lens sleeve 50 hold the condenser lens 49. A further retainer ring 51 and outer sleeve 53 hold a filter lens 52.

Figure 4C:
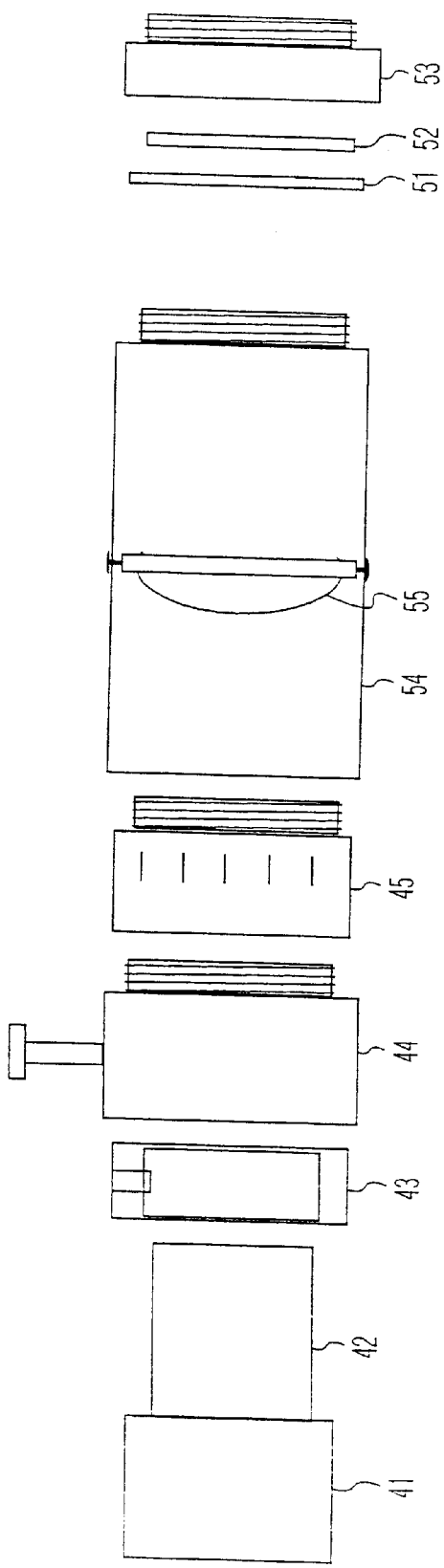
Figure 4D:
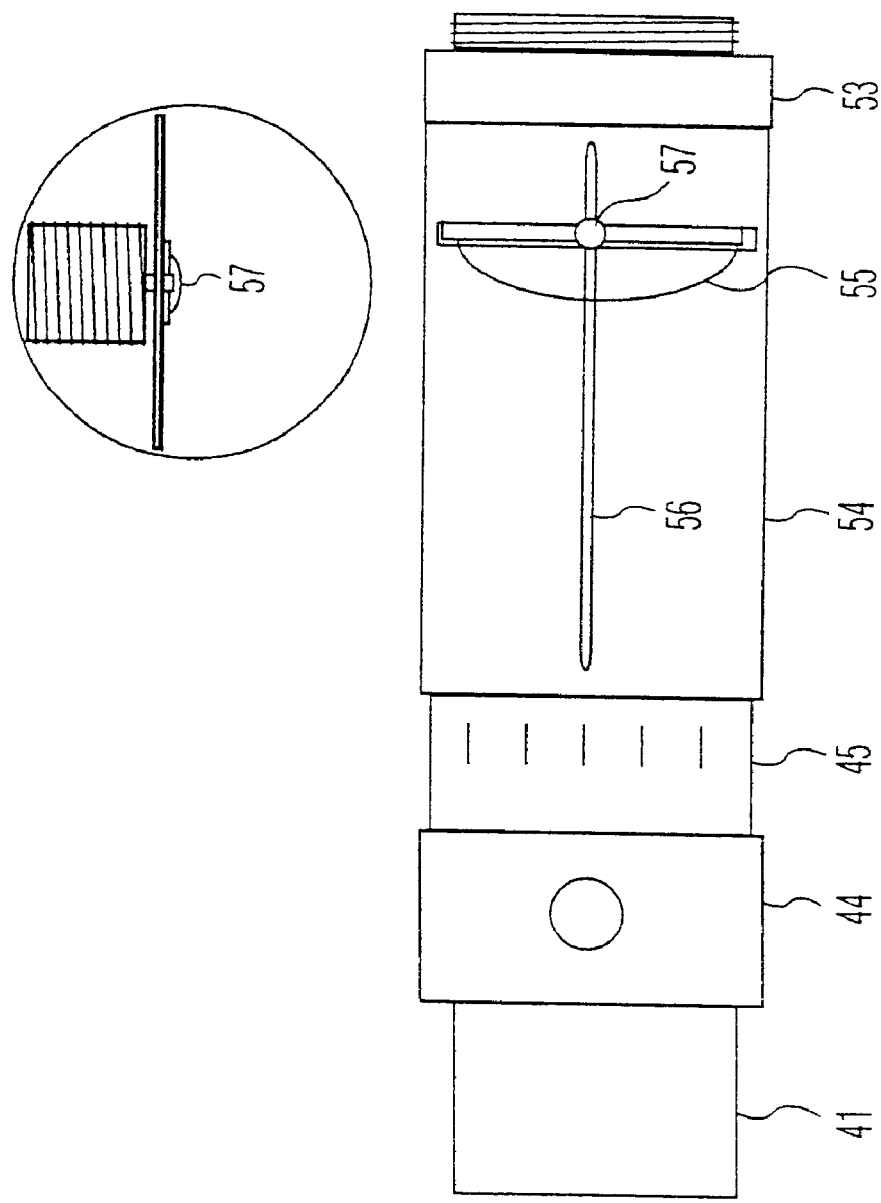

FIGS. 4C and 4D show, respectively, an exploded and assembled view of an alternate embodiment of a focusable fiber optic end assembly, which projects illumination on an object to be photographed. In this embodiment, the fine thread focus tube inner 46 mates and fine thread focus tube outer 47 are replaced with a mechanism 54 which allows the plano-convex condenser lens 55 to slide in a groove 56, and be fixed in position by a lock 57.

This focusing assembly allows the light entering to be adjusted as to its intensity by means of the variable iris 45 diaphragm. It then can be focused to a specific point using the focus tube 46, 47 or 54. This allows production of specific spot sizes at specific working distances.

It is understood that, for various illumination effects, the number, arrangement and nature of the elements may be varied, and therefore the elements shown in FIGS. 4A, 4B. 4C and 4D are exemplary only.

Figure 5A:
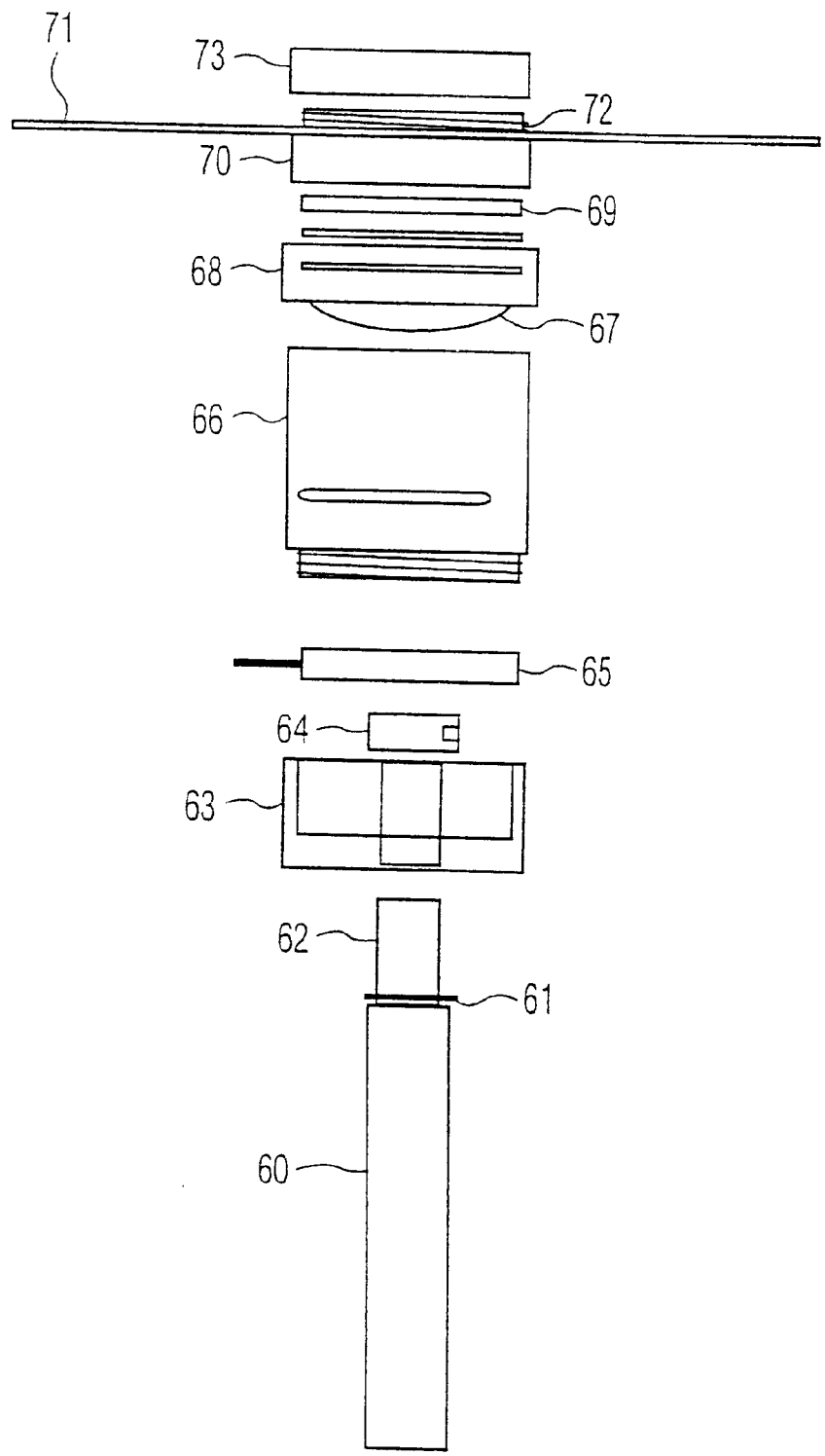
FIGS. 5A, 5B and 5C show, respectively, an exploded and assembled side view, and exploded side view of an alternate embodiment, all according to the present invention, of fiber optic rear illumination heads.
Figure 5B:
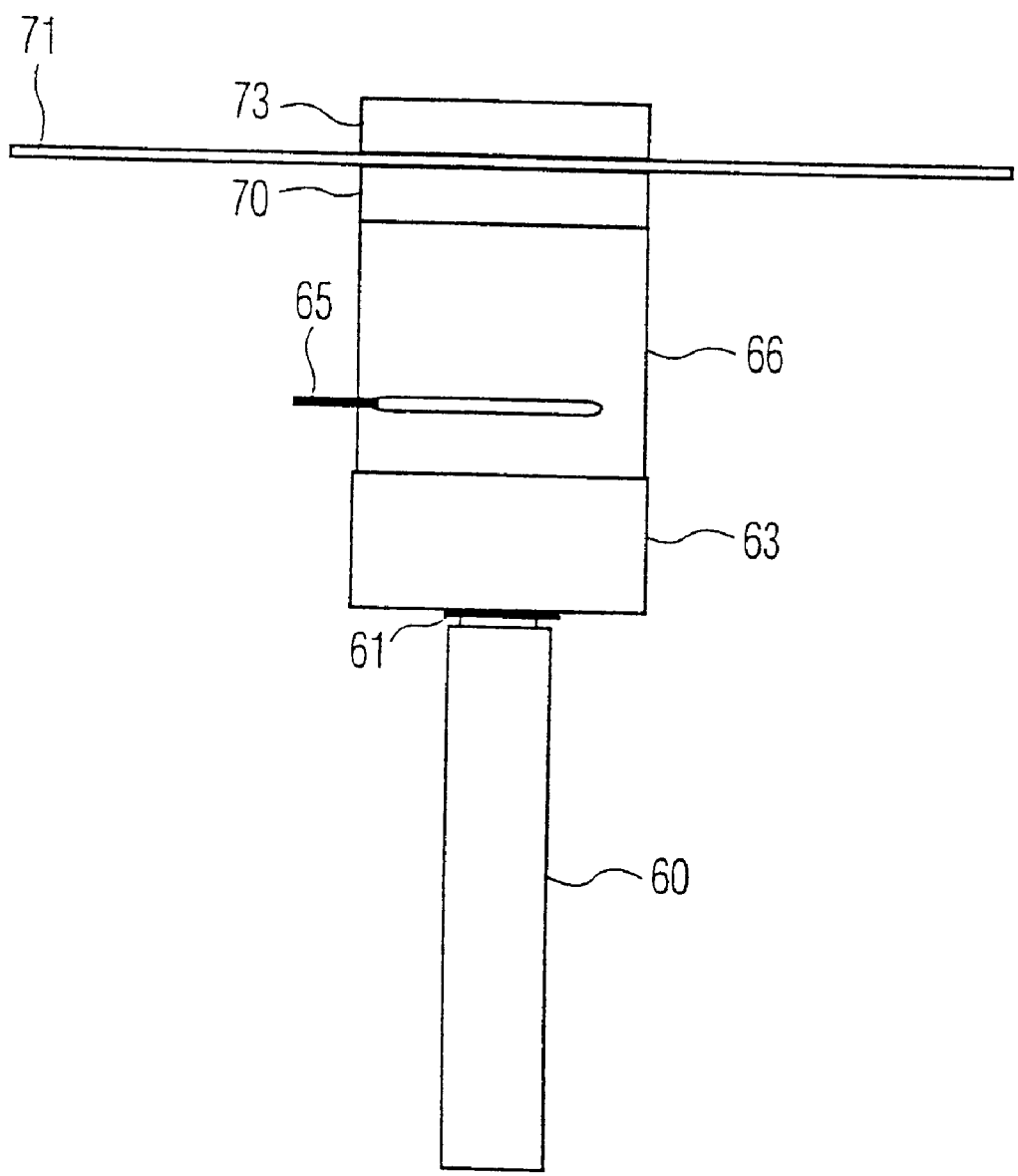

FIGS. 5A and 5B show an exploded and assembled view, respectively, of a variable and filterable under-light, which provides rear illumination of an object to be photographed. Light from the fiber optic cable with outer sleeve 60, carried in fiber optic inner feral 62, which is held in position by retainer ring 61, retainer collar 63 and locking ring 64, passes through a variable iris 65 to allow a manual means of adjusting the intensity of light as it passes through outer lens housing 66 into lens 67. The lens 67 is held in position by retainer ring 68. Light passes through filter 69, held in position by filter housing 70. This assembly is attached to an inspection stage cover plate 71 with thread region 72, and secured by means of a threaded retainer ring 73.

Figure 5C:
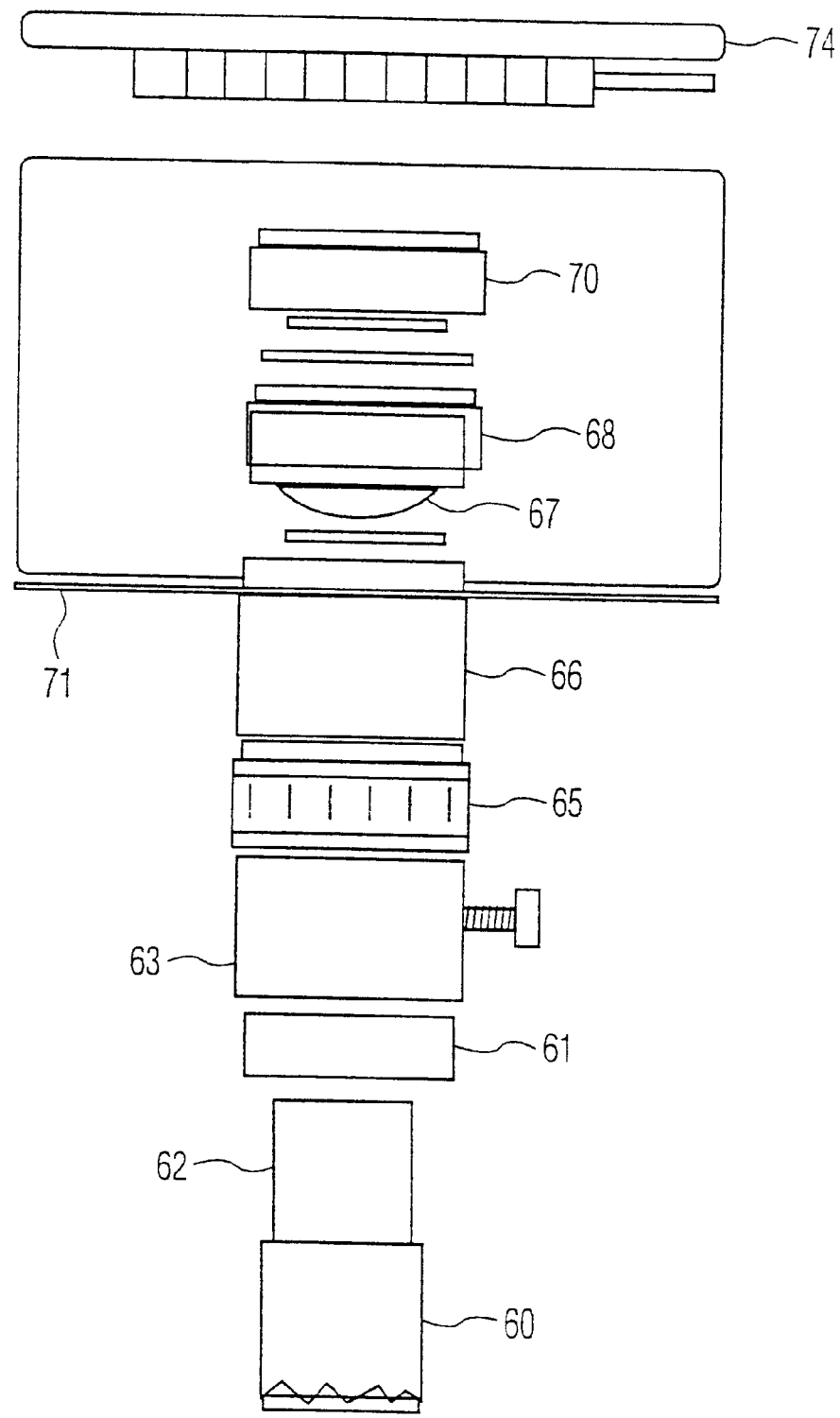

FIG. 5C shows an exploded view of an alternate embodiment of a sub-stage fiber optic illuminator. Two significant differences are present from the embodiment of FIGS. 5A and 5B: first, the cover plate 71 is mounted to the outer lens housing 66, lower than the filter housing 70. Second, an iris 74 is provided at the stage level.

Figure 6:
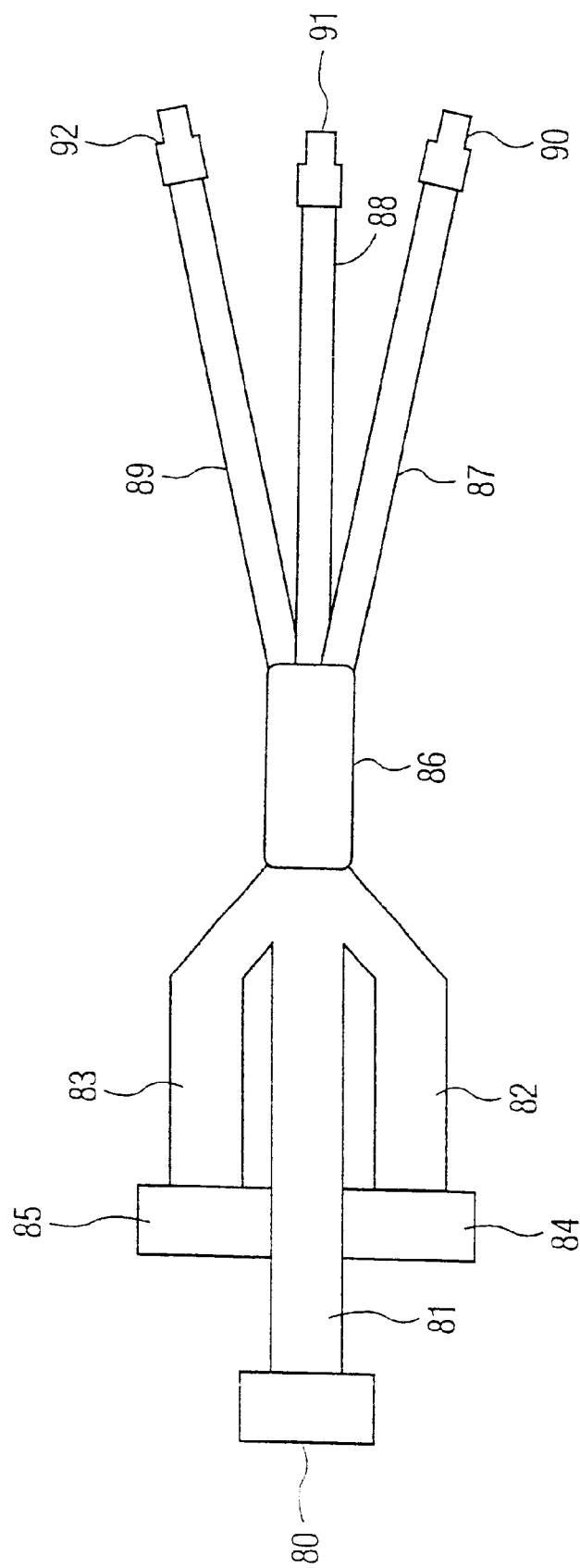
FIG. 6 shows a fiber optic combiner and splitter with randomizing chamber.

FIG. 6 shows a multi-input and multi-output fiber optic distribution network. As shown three separate input portions are provided. One portion, shown centrally, 81 is intended for receiving pilot lamp output, and two lateral portions 82, 83 are intended for receiving flash lamp output. This arrangement is particularly adapted for receiving illumination directly from flash lamps which are relatively large and dispersed, such as U-shaped bulbs. Entrance apertures 80, 84, 85 convert the round fiber bundle of the portions 81, 82, 83, respectively, into linear surfaces to efficiently gather light along a radial surface of respective light source. The light is transmitted from the respective light source the bundles 81, 82, 83 into the randomizing chamber 86. The single fibers from each bundle 81, 82, 83 are highly randomized (completely mixed together). This insures that the light traveling out to the separate legs 87, 88, 89 to the illumination heads is distributed proportionally and evenly. At the end of each leg 87, 88, 89 a machined feral 90, 91, 92 is attached to facilitate the attachment of any desired focusing or filtering device. This configuration shows three pick-ups and three exit points. Any combination of 2 or more pick-ups and at least one exit leg can be used, as needed, per specific application. For practical purposes, the pick-up fibers may terminate at a receptacle (not shown), fitted to the end of the randomizing chamber 86, in order to accept any combination of necessary fiber optic conduits, at the expense of lost efficiency.

Figure 7A:
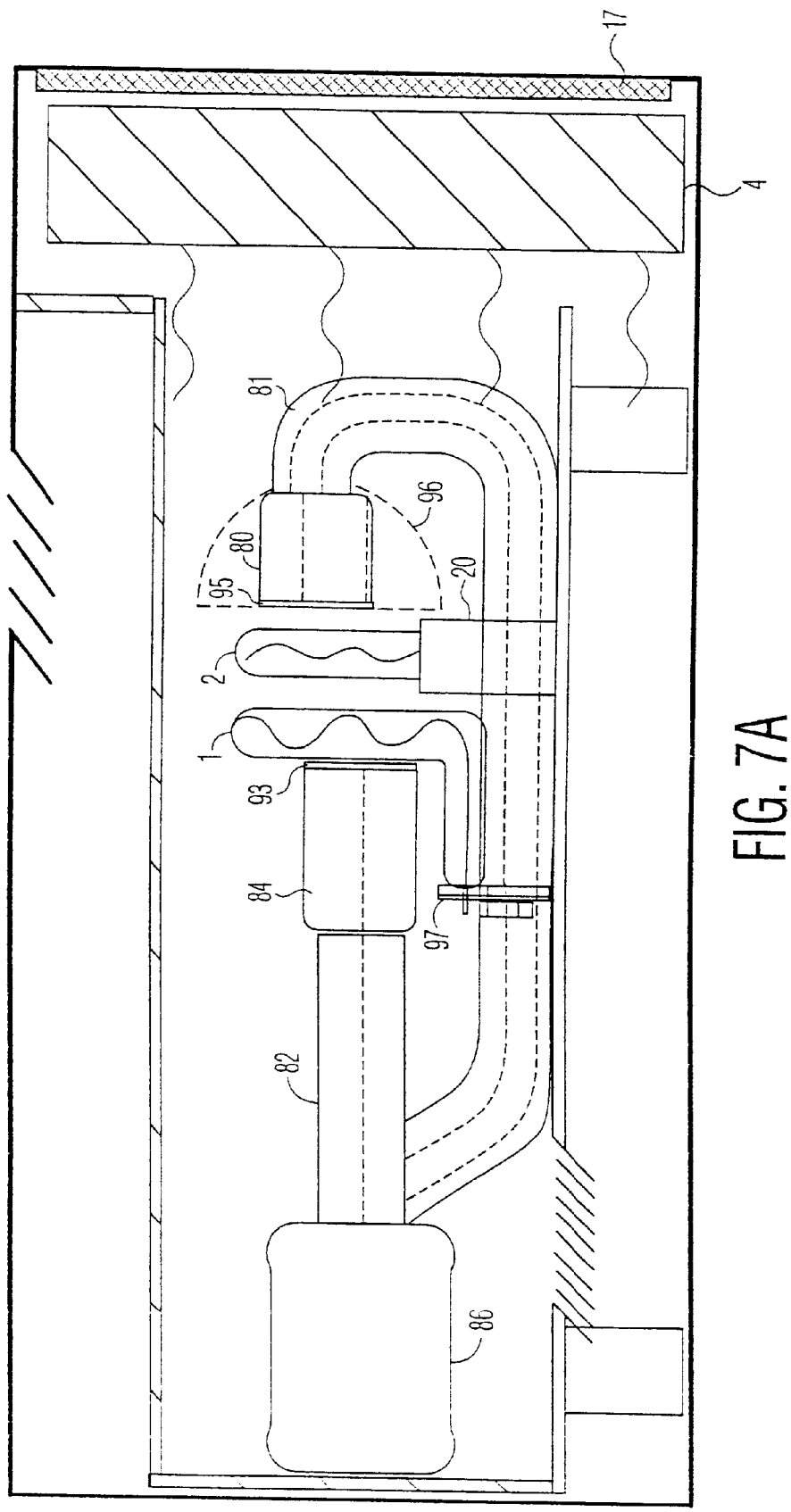
FIGS. 7A and 7B show a side and top view, respectively, of a further embodiment of a fiber optic light source according to the present invention.
Figure 7B:
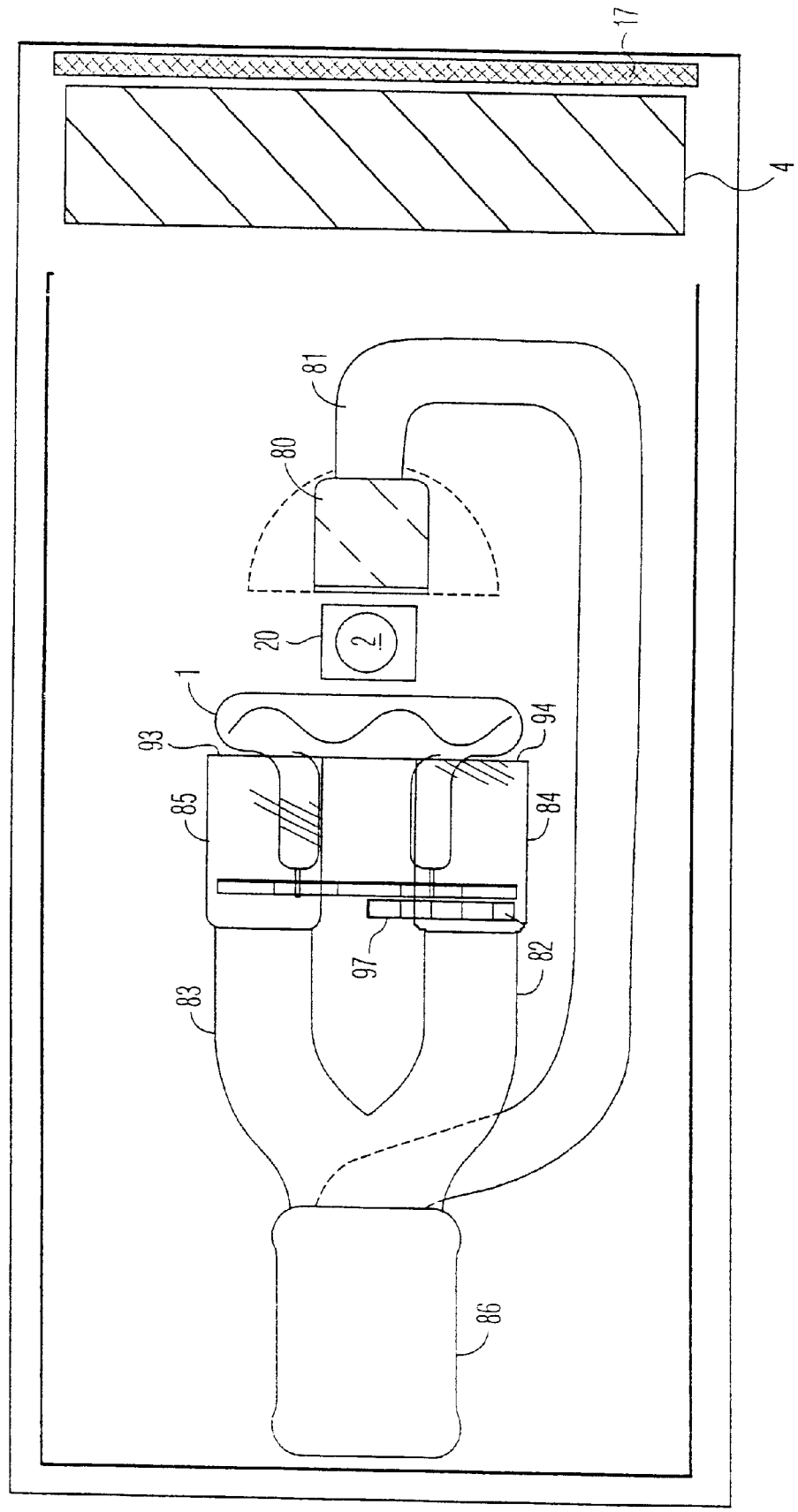

FIGS. 7A and 7B show, respectively, a side and top view of an embodiment of the invention employing the fiber optic distribution network shown in FIG. 6. The entrance apertures translate a circular fiber optic bundle into an elongated surface to correspond to the surface of the respective light source, e.g., flash lamp 1 or pilot lamp 2. This arrangement allows the light source to remain within the critical angle of acceptance of the optical fibers. The surfaces of the fiber optic entrance apertures 80, 84, 85 may be covered with cold infrared reflective surfaces 93, 94, 95. An ellipsoidal cold mirror infrared reflector 96 is provided to reflect a portion of the light from lamps 1, 2 into entrance apertures 84, 85. A flash trigger circuit 97 is provided to trigger the flash lamp 1.

Figure 8A:
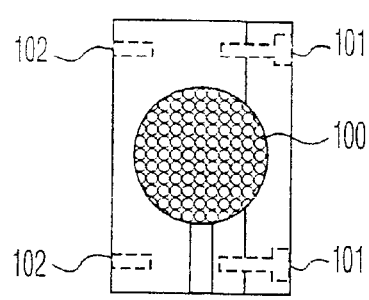
FIGS. 8A, 8B, 8C, 8D and 8E show, respectively, a front view of a circular fiber optic collector, a front view of a rectangular fiber optic collector, a cross section of the embodiment according to FIG. 8B, a perspective view of the embodiment according to FIG. 8B, and an exploded view of the embodiment according to FIG. 8B, respectively.

FIG. 8A shows the entrance port into the pickup for a round fiber optic bundle 100. The round fiber optic bundle 100 is secured by set screws 101 and the assembly is mounted via securing points 102.

Figure 8B:
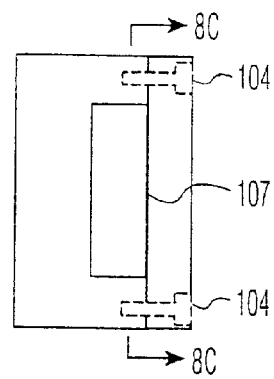
Figure 8C:
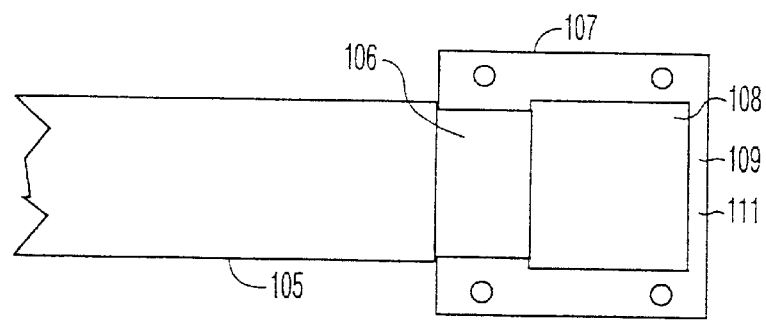
Figure 8D:
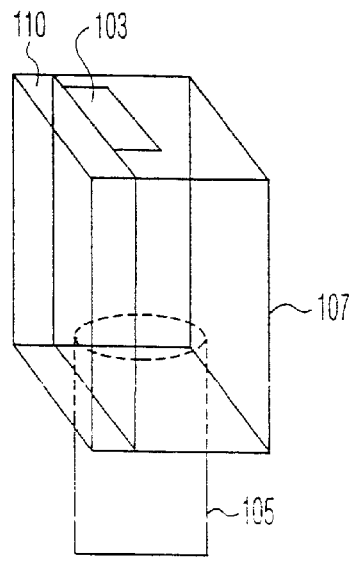
Figure 8E:
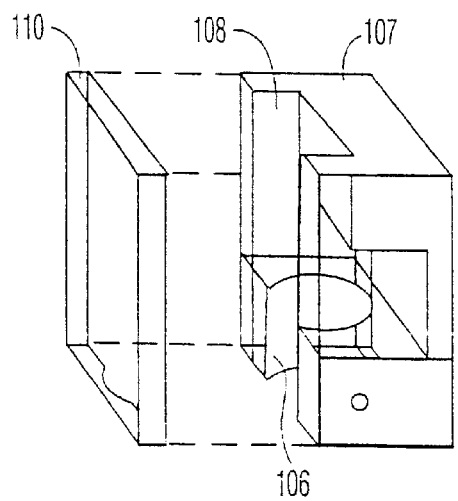

Likewise. FIG. 8B shows the entrance port into the pickup for a rectangular fiber optic bundle 103. The rectangular fiber optic bundle 103 is secured by set screws 104. The fiber optic bundle 105 has a machined feral 106 on the end of the sheathing, which fits into the main block 107. The separate glass strands of the fiber optic bundle 105 are flattened and spread out in expansion chamber 108, then fitted into a rectangular space 109, secured with high temperature clear epoxy and covered with main block cap 110, which is secured by cap locking screws 104. The rectangular free surface of the fibers is covered by IR filter 111. FIGS. 8D and 8E show, respectively, a perspective view of the pickup of FIG. 8B and an exploded view of the main block 107 and main block cap 110 assembly.

The orientation of the pickup to the light source is important for the efficient operation. The angle of the optical fibers within the pick-ups must not exceed 20 degrees with respect to the angle of incidence of the light, which is the critical angle for the fiber optic conduit described. The pickups must also be mounted in very close proximity to the respective light source due to the fact that the further the pickup is from the source, the greater the amount of light for which the angle of incidence exceeds the critical angle. Distance is determined by relative sizes of the source to the pickups. Of course, the distance of the fibers from the pilot must be sufficient to avoid burning of the epoxy. A cold mirror in the optical path may also be used to prevent burning or scorching of the fiber optics.

Figure 9A:
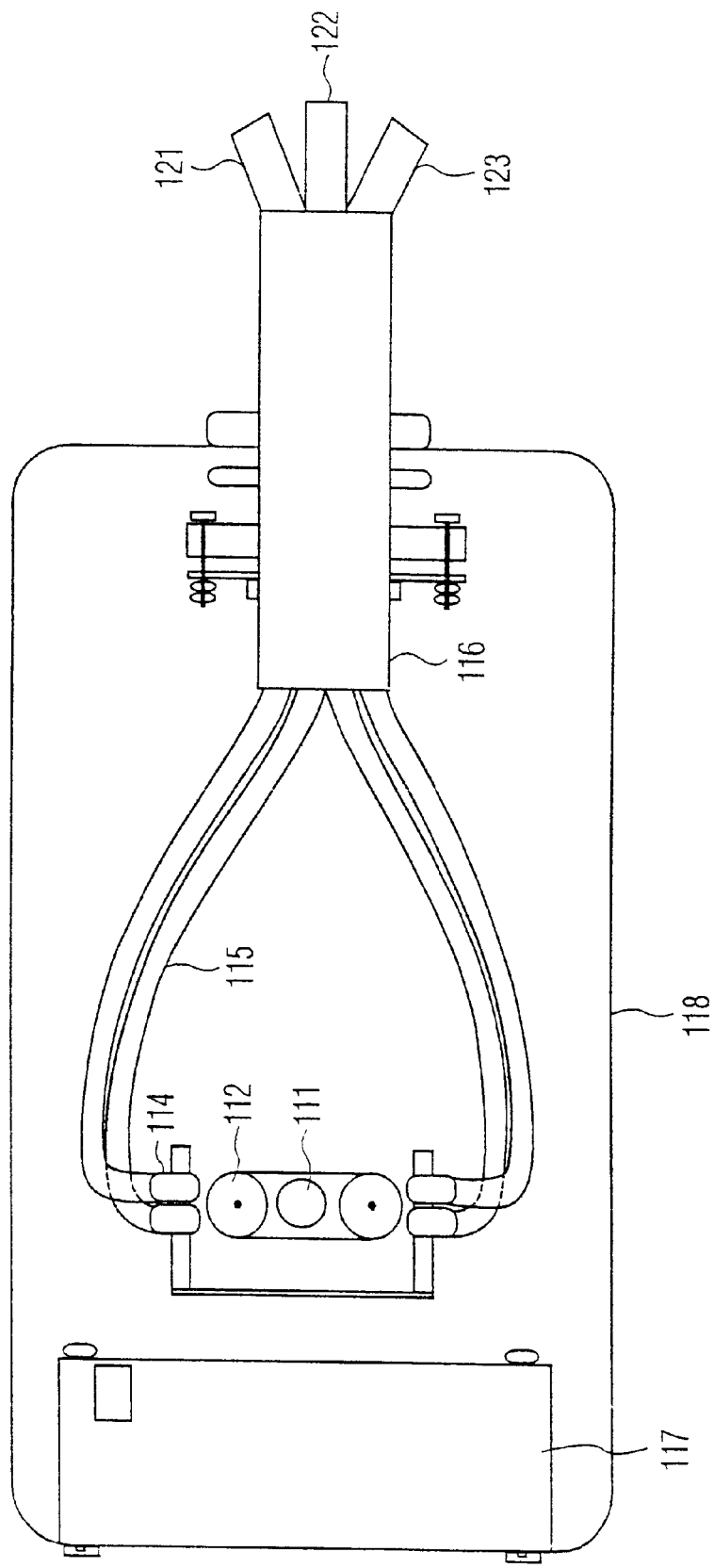
FIGS. 9A and 9B show a top view and a detail front view of a lamp assembly according to an embodiment of the present invention.
Figure 9B:
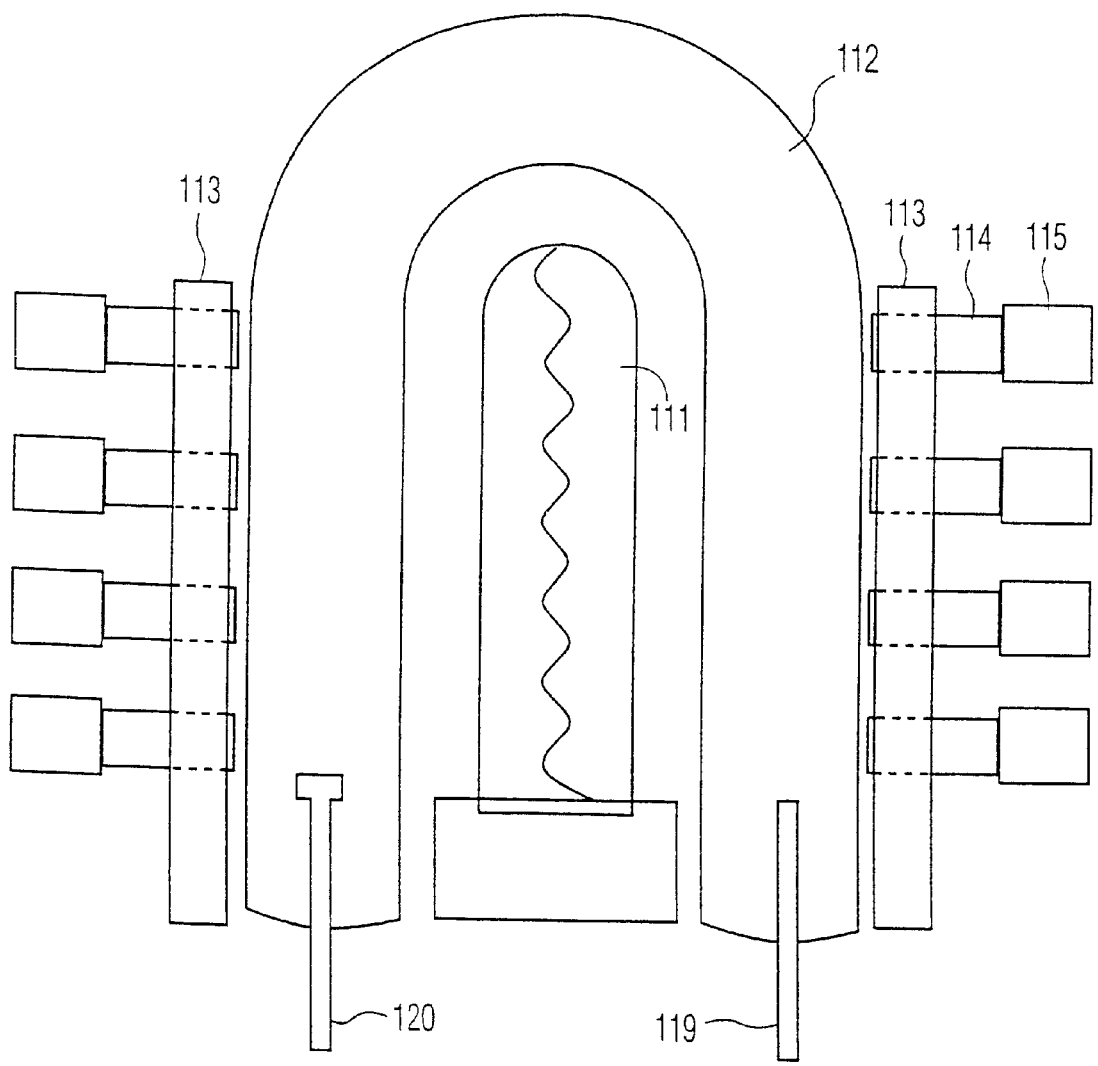

FIGS. 9A and 9B show a preferred embodiment of the invention, wherein a U-shaped flash lamp 112 surrounds a cylindrical pilot lamp 111. Arrays of fiber optic pickups 114 are mounted in a frame 113 on both sides of the flash lamp 112. The side surfaces of the pilot lamp 111 and flash lamp 112 are open, allowing a free flow of air from the fan 117. Fiber optic bundles 115 lead to a randomizing chamber 116, which either lead directly to a set number of illumination heads, e.g., three, or to a fiber optic junction which allows use of modular illumination heads. The entire lamp system is placed in an enclosure 118, to shield the structures and control air flow. FIGS. 9A and 9B show that the fiber optic pickups 114 are staggered.

Figure 10A:
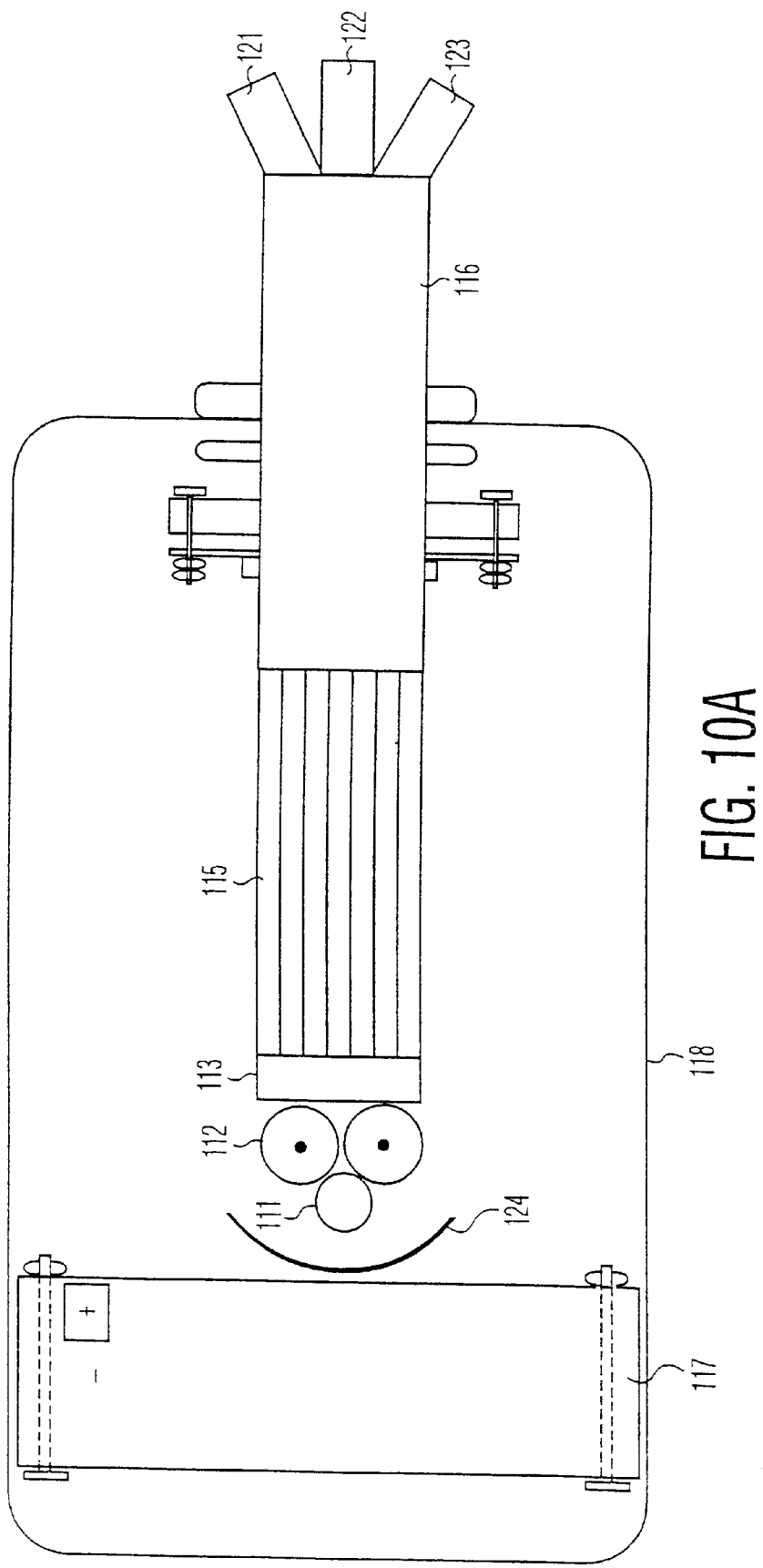
FIGS. 10A and 10B show top views of further embodiments of the fiber optic illuminator according to the present invention.
Figure 10B:
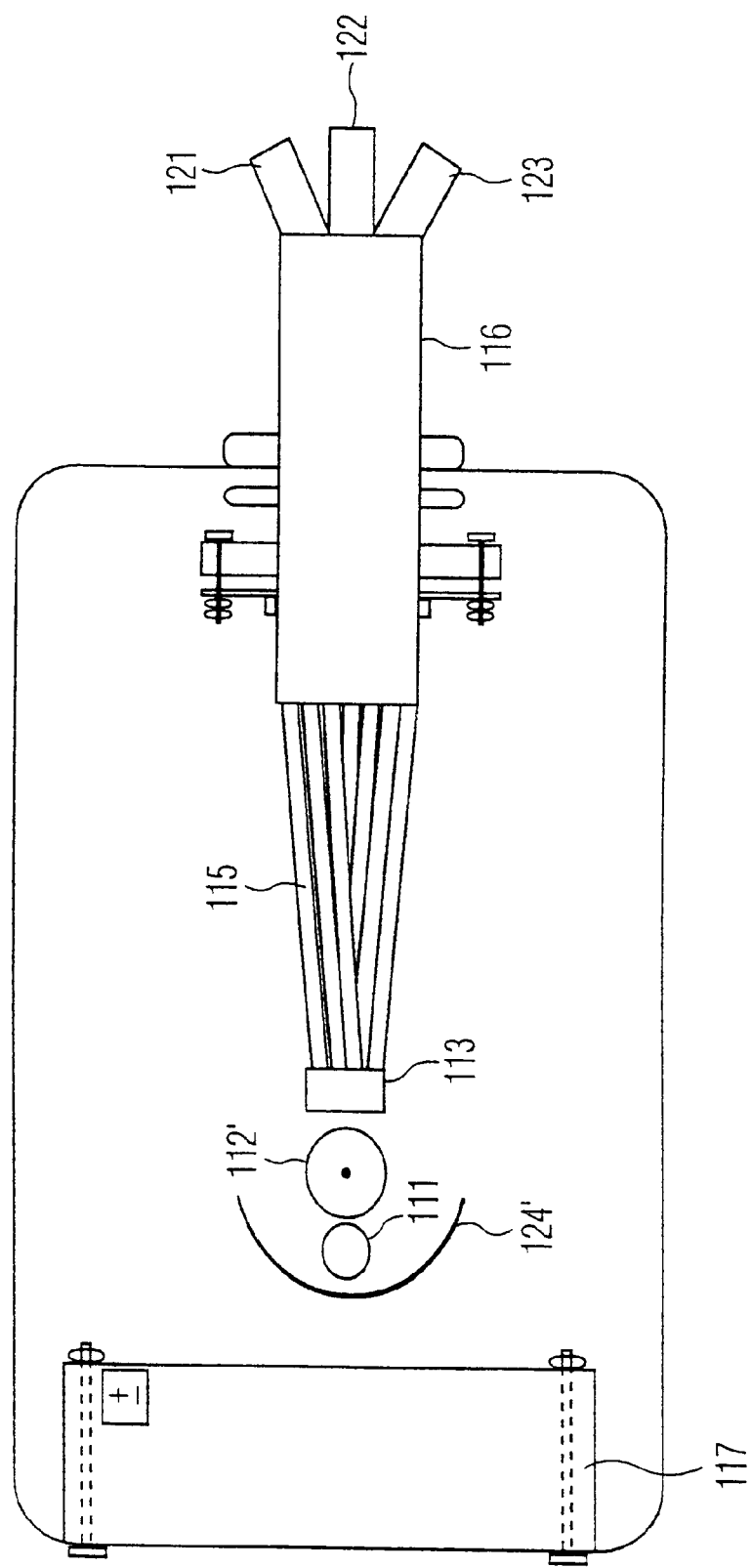

FIGS. 10A and 10B show alternate embodiments of the invention. Instead of arraying the fiber optics laterally to the flash lamp 112, these embodiments provide an array of fiber optic pickups from a single side of the flash lamp 112. In each case, a reflector 124, 124', preferably a cold mirror type, is provided to capture the optical emissions from the opposite side of the flash lamp 112 and the pilot lamp 111. FIG. 10A shows a U-shaped flash lamp 112 with two emitting portions within the input aperture of the fiber optic pickups 114. FIG. 10B shows a cylindrical flash lamp 112' which has a single emitting portion within the input aperture. Thus, the reflector 124, 124' differ in focal length and placement of lamps with respect to the focus.

There has thus been shown and described novel illuminators and novel aspects of illumination systems, which fulfill all the objects and advantages sought therefore. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A fiber optic illumination system comprising:
    (a) at least one pilot lamp, capable of producing a light output;
    (b) at least one strobe, each being capable of producing an illumination flash pulse;
        at least one of said light output and said illumination flash pulse being subject to spatial non-uniformity, and
    (c) a plurality of fiber optic heads, each of said heads being adapted to transmit illumination from an entrance aperture over a dispersed spatial region encompassing said spatial non-uniformity, disposed to receive said light output from said at least one pilot lamp and said illumination flash pulse from said at least one strobe, for transmission to an exit aperture, wherein from each fiber optic head, an illumination flash pulse has an equivalent color.

2. The fiber optic illumination system according to claim 1, wherein each fiber optic head has an equivalent illumination flash pulse.

3. The fiber optic illumination system according to claim 1, wherein at least one fiber to each fiber optic head carries both a portion of the light output and a portion of the illumination flash pulse.

4. The fiber optic illumination system according to claim 1, wherein separate optical fibers carry light output and illumination flash pulse.

5. The fiber optic illumination system according to claim 1, wherein each fiber optic head has means for adjusting illumination flash pulse intensity.

6. The fiber optic illumination system according to claim 1, further comprising a plurality of optical fibers extending from the at least one strobe to the plurality of fiber optic heads, each optic fiber having an input end and an output end, wherein said input ends are arrayed at different locations over a spatial region with respect to the at least one strobe, wherein a relation between a location of an input end of a fiber and a fiber optic head housing an output end is essentially random.

7. The fiber optic illumination system according to claim 1, wherein a single strobe and a plurality of pilot lamps producing said light output are provided.

8. The fiber optic illumination system according to claim 1, wherein a plurality of strobes producing said illumination flash pulse and a plurality of pilot lamps producing said light output are provided.

9. The fiber optic illumination system according to claim 1, further comprising an electronic control for controlling said at least one strobe and maintaining a color temperature of said at least one strobe over a range of illumination flash pulse intensities.

10. The fiber optic illumination system according to claim 1, further comprising means for ceasing said light output during an illumination flash pulse.

11. The fiber optic illumination system according to claim 1, further comprising an electronic circuit for controlling said pilot lamp and said strobe and maintaining the predefined relationship of intensity of light output to an intensity of an illumination flash pulse, for each fiber optic head.

12. The fiber optic illumination system according to claim 1, further comprising an electronic circuit for controlling said strobe and maintaining a consistent color for the portion of the illumination flash pulse from each fiber optic head.

13. The fiber optic illumination system according to claim 1, the plurality of fiber optic heads comprising three fiber optic heads.

14. The fiber optic illumination system according to claim 1, further comprising a plurality of optical fibers extending from the at least one strobe to the plurality of fiber optic heads, each optic fiber having an input end and an output end, wherein said input ends are arrayed in a plurality of bundles at sequentially varying locations over a spatial region with respect to the at least one strobe, wherein a portion of optical fibers in each bundle is provided with its output end in each fiber optic head.

15. A fiber optic illumination method, comprising the steps of:
(a) providing at least one pilot lamp, each being capable of producing a light output;
(b) providing at least one strobe, each being capable of producing an illumination flash pulse;
(c) providing a plurality of fiber optic heads, each of said heads being adapted to transmit illumination received from said at least one pilot lamp and said at least one strobe from an exit aperture;
(d) maintaining, from each fiber optic head, an intensity of light output from said at least one pilot lamp having a predefined equivalent relationship to an intensity of an illumination flash pulse from said at least one strobe.

16. A microphotographic optical illuminator, comprising:
(a) an optic head, being adapted to transmit illumination from an exit aperture for illumination of microphotographic specimens without substantial degradation thereof;
(b) a pilot lamp, being capable of producing a continuous light output having an intensity;
(c) a variable intensity strobe, being capable of producing an illumination flash pulse having a selectable illumination intensity; and
(d) means for triggering the illumination flash pulse to a selected illumination intensity,
said optic head receiving said continuous light and said illumination flash pulse for transmission to said exit aperture,
wherein said intensity of said continuous light output is controlled to have a predefined intensity ratio to the selected illumination intensity of the illumination flash pulse over a range of illumination flash pulse intensities.

17. The microphotographic illuminator according to claim 16, further comprising:
(a) a second optic head, being adapted to transmit illumination, comprising continuous light from a pilot lamp, having an intensity, and an illumination flash pulse from a variable intensity strobe, having a selectable illumination intensity, from an exit aperture for illumination of microphotographic specimens without substantial degradation thereof; and
wherein said triggering means triggers the illumination flash pulse of said optic head and the illumination flash pulse of said second optic head, and wherein said intensity of said continuous light output of said optic head and of said second optic head each have an identical predefined intensity ratio to the selected illumination intensity of the respective illumination flash pulse over a range of respective illumination flash pulse intensities.

18. The microphotographic illuminator according to claim 17, wherein the illumination flash pulses from the optic head and the second optic head have an equivalent color.

19. A fiber optic illumination system comprising:
(a) at least one pilot lamp, adapted for producing a light output;
(b) at least one strobe, adapted for producing an illumination flash pulse; and
(c) a plurality of fiber optic heads, each of said heads being adapted to transmit illumination received from said at least one pilot lamp and said at least one strobe from an exit aperture,
wherein, from each of said plurality of fiber optic heads, an intensity of said light output from said at least one pilot lamp has a predefined equivalent relationship to an intensity of an illumination flash pulse from said at least one strobe.

20. The fiber optic illumination system according to claim 19, wherein each fiber optic head receives equivalent flash pulse illumination.

21. The fiber optic illumination system according to claim 19, wherein fibers of said fiber optic head carry both a portion of the light output and a portion of the illumination flash pulse.

22. The fiber optic illumination system according to claim 19, wherein separate optical fibers carry light output and illumination flash pulse.

23. The fiber optic illumination system according to claim 19, wherein fibers of said plurality of fiber optic heads are spatially mixed with each other to provide overlapping entrance apertures with respect to said at least one strobe and said at least one pilot lamp.

24. The fiber optic illumination system according to claim 19, comprising three fiber optic heads.

25. The fiber optic illumination system according to claim 19, further comprising a plurality of optical fibers extending from the at least one strobe to the plurality of fiber optic heads, each optic fiber having an input end and an output end, wherein said input ends are arrayed in a plurality of bundles at respectively varying locations over a spatial region with respect to said at least one strobe and said at least one pilot lamp, wherein a portion of optical fibers in each bundle is provided with its output end in each fiber optic head.

26. The fiber optic illumination system according to claim 19, wherein from each fiber optic head, an illumination flash pulse has an equivalent color.

27. A fiber optic illumination method, comprising the steps of:
(a) providing at least one pilot lamp, each being capable of producing a light output;
(b) providing at least one strobe, each being capable of producing an illumination flash pulse;
(c) providing a plurality of fiber optic heads, each of said heads being adapted to transmit illumination received from said at least one pilot lamp and said at least one strobe from an exit aperture; and
(d) maintaining, from each fiber optic head, an equivalent relationship of an intensity of light output from said at least one pilot lamp and an intensity of an illumination flash pulse from said at least one strobe.

28. The fiber optic illumination method according to claim 27, further comprising the step of maintaining, from each fiber optic head, an illumination flash pulse having an equivalent color.

* * * * *